United States Patent
Bobier-Tiu et al.

(10) Patent No.: US 11,279,372 B2
(45) Date of Patent: Mar. 22, 2022

(54) SYSTEM AND METHOD FOR CONTROLLING A VEHICLE HAVING AN AUTONOMOUS MODE AND A SEMI-AUTONOMOUS MODE

(71) Applicant: Toyota Research Institute, Inc., Los Altos, CA (US)

(72) Inventors: Carrie Bobier-Tiu, Sunnyvale, CA (US); Avinash Balachandran, Sunnyvale, CA (US); Sarah Koehler, Sunnyvale, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 154 days.

(21) Appl. No.: 16/549,287

(22) Filed: Aug. 23, 2019

(65) Prior Publication Data
US 2021/0053582 A1    Feb. 25, 2021

(51) Int. Cl.
*B60W 50/08* (2020.01)
*G05D 1/02* (2020.01)
(Continued)

(52) U.S. Cl.
CPC .......... *B60W 50/082* (2013.01); *B60W 30/12* (2013.01); *B60W 50/0097* (2013.01);
(Continued)

(58) Field of Classification Search
CPC .. B60W 50/082; B60W 30/12; B60W 50/087; B60W 50/0097; B60W 2050/007; B60W 2050/0012; G05D 1/0221
See application file for complete search history.

(56) References Cited

U.S. PATENT DOCUMENTS 6,574,560 B2   6/2003 Abe et al.
8,352,112 B2   1/2013 Mudalige
(Continued)

OTHER PUBLICATIONS

Gray et al., "Semi-Autonomous Vehicle Control for Road Departure and Obstacle Avoidance," IFAC Symposium on Control in Transportation Systems, 6 pages, (2012).
(Continued)

*Primary Examiner* — Jeff A Burke
*Assistant Examiner* — Kyle T Johnson
(74) *Attorney, Agent, or Firm* — Christopher G. Darrow; Darrow Mustafa PC

(57) ABSTRACT

A system for controlling a vehicle having an autonomous mode and a semi-autonomous mode includes one or more processors and a memory in communication with the one or more processors. The memory stores a command generating module and a transmission module. The command generating module causes the one or more processors to generate, in response to an input, at least one control signal for controlling the vehicle by an envelope control system. The envelope control system utilizes a common control scheme for both the semi-autonomous mode and the autonomous mode, wherein the input is a driver input when the vehicle is in the semi-autonomous mode and the input is a pseudo-driver input when the vehicle is in the autonomous mode. The transmission module causes the one or more processors to transmit the at least one control signal to a vehicle motion controller, wherein the vehicle motion controller controls the movement of the vehicle.

20 Claims, 4 Drawing Sheets

(51) Int. Cl.
 B60W 30/12 (2020.01)
 B60W 50/00 (2006.01)
(52) U.S. Cl.
 CPC ......... *B60W 50/087* (2013.01); *G05D 1/0221* (2013.01); *B60W 2050/007* (2013.01); *B60W 2050/0012* (2013.01)

(56) References Cited

U.S. PATENT DOCUMENTS

| | | | |
|---|---|---|---|
| 8,437,890 B2 | 5/2013 | Anderson et al. | |
| 9,463,793 B2 | 10/2016 | Lind et al. | |
| 9,884,631 B2* | 2/2018 | James | B60W 50/14 |
| 9,919,708 B2 | 3/2018 | Pallett et al. | |
| 2011/0301786 A1* | 12/2011 | Allis | G05D 1/0011 |
| | | | 701/2 |
| 2012/0166032 A1* | 6/2012 | Lee | B62D 1/286 |
| | | | 701/23 |
| 2015/0284008 A1* | 10/2015 | Tan | B60W 30/12 |
| | | | 701/28 |
| 2015/0353085 A1* | 12/2015 | Lee | B60W 30/12 |
| | | | 701/533 |
| 2016/0187879 A1* | 6/2016 | Mere | B60W 40/09 |
| | | | 701/23 |
| 2018/0257702 A1* | 9/2018 | Klesing | B62D 1/286 |
| 2019/0009794 A1 | 1/2019 | Toyoda et al. | |
| 2019/0101917 A1* | 4/2019 | Yao | B60W 50/0097 |
| 2020/0250486 A1* | 8/2020 | Kim | G05D 1/0088 |
| 2020/0290625 A1* | 9/2020 | Berntorp | B60W 40/068 |
| 2020/0307691 A1* | 10/2020 | Kalabic | B60W 30/18163 |
| 2021/0053582 A1* | 2/2021 | Bobier-Tiu | B60W 50/0097 |
| 2021/0056713 A1* | 2/2021 | Rangesh | G06K 9/6267 |

OTHER PUBLICATIONS

Kapania, "Trajectory Planning and Control for an Autonomous Race Vehicle," Stanford University, Dissertation by Nitin Rakesh Kapania (2016).

* cited by examiner

SYSTEM AND METHOD FOR CONTROLLING A VEHICLE HAVING AN AUTONOMOUS MODE AND A SEMI-AUTONOMOUS MODE

TECHNICAL FIELD

The subject matter described herein relates, in general, to systems and methods for controlling a vehicle having an autonomous mode and a semi-autonomous mode.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some current vehicles have semi-autonomous and/or autonomous modes. With regard to a semi-autonomous mode, the vehicle may provide features that allow the vehicle to assist the driver to prevent or minimize accidental collisions with other vehicles, pedestrians, or other objects. Vehicles that have an autonomous mode, take this concept even further. In an autonomous mode, the vehicle is in complete control of the driving, without the need of input from the driver.

However, some vehicles that are equipped with an autonomous mode also allow the vehicle to function in a semi-autonomous mode, thereby allowing the driver to operate the vehicle. The purpose for allowing the driver to operate the vehicle is to accommodate situations that the autonomous mode of the vehicle may be unable to correctly navigate. For example, some vehicles with an autonomous mode have issues navigating roadways that are under construction. By allowing the vehicle to switch to a semi-autonomous mode, the driver can provide the appropriate inputs to pilot the vehicle safely.

SUMMARY

This section generally summarizes the disclosure and is not a comprehensive explanation of its full scope or all its features.

In one embodiment a method for controlling a vehicle having an autonomous mode and a semi-autonomous mode includes the steps of generating, in response to an input, at least one control signal for controlling the vehicle by an envelope control system, and transmitting the at least one control signal to a vehicle motion controller, wherein the vehicle motion controller controls the movement of the vehicle. The envelope control system utilizes a common control scheme for both the semi-autonomous mode and the autonomous mode, wherein the input is a driver input when the vehicle is in the semi-autonomous mode and the input is a pseudo-driver input when the vehicle is in the autonomous mode.

In another embodiment, a system for controlling a vehicle having an autonomous mode and a semi-autonomous mode includes one or more processors and a memory in communication with the one or more processors. The memory stores a command generating module and a transmission module. The command generating module causes the one or more processors to generate, in response to an input, at least one control signal for controlling the vehicle by an envelope control system. The envelope control system utilizes a common control scheme for both the semi-autonomous mode and the autonomous mode, wherein the input is a driver input when the vehicle is in the semi-autonomous mode and the input is a pseudo-driver input when the vehicle is in the autonomous mode. The transmission module causes the one or more processors to transmit the at least one control signal to a vehicle motion controller, wherein the vehicle motion controller controls the movement of the vehicle.

In yet another embodiment, a non-transitory computer-readable medium for controlling a vehicle having an autonomous mode and a semi-autonomous mode includes instructions that when executed by one or more processors cause the one or more processors to generate, in response to an input, at least one control signal for controlling the vehicle by an envelope control system and transmit the at least one control signal to a vehicle motion controller, wherein the vehicle motion controller controls the movement of the vehicle. The envelope control system utilizes a common control scheme for both the semi-autonomous mode and the autonomous mode, wherein the input is a driver input when the vehicle is in the semi-autonomous mode and the input is a pseudo-driver input when the vehicle is in the autonomous mode.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described is a system and method for controlling a vehicle having an autonomous mode and a semi-autonomous mode. The system includes one or more processors that include both a command generating module and a transmission module. When in either the autonomous mode or the semi-autonomous mode, an envelope control system utilizes a common control scheme for both modes. The envelope control system may be a system that controls a process, such as autonomous or semi-autonomous driving systems, that satisfy a set of constraints. Moreover, the envelope control system may be an optimal-control based control system that selects control inputs by minimizing an objective function. The objective function may be defined in terms of both present and predicted system variables and is evaluated using an explicit model to predict future process output. Here, the objective function may be the common control scheme utilized in both the autonomous and semi-autonomous modes.

When in an autonomous mode, the common control scheme utilizes a pseudo-driver as an input. A pseudo-driver may be one or more predicted driver commands. When in a semi-autonomous mode, the common control scheme utilizes the inputs from the driver as the input. When switching between an autonomous and semi-autonomous mode, the envelope control system may simply switch which input is provided to the common control scheme.

Figure 1:
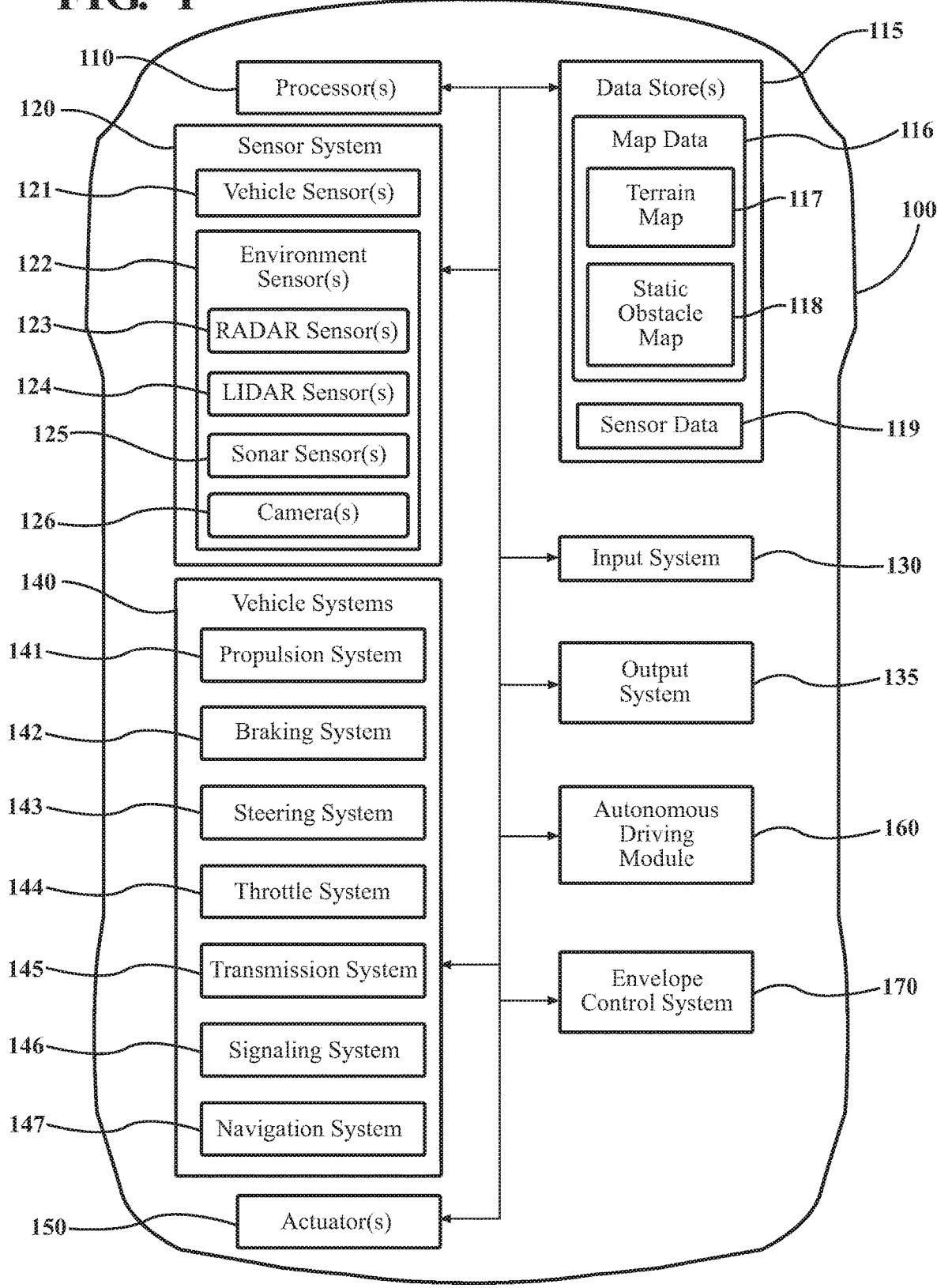
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation such as the levels defined by the Society of Automotive Engineers (SAE) (e.g., levels 0-5). As such, the autonomous system may provide semi-autonomous control or fully autonomous control as discussed in relation to the autonomous driving module 160.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 includes an envelope control system 170. The envelope control system 170 may be incorporated within the autonomous driving module 160 or may be separate as shown. The envelope control system 170 may determine the boundaries and limits within which a vehicle is estimated to remain stable. In addition to determining the limits, the envelope control system 170 may also control the vehicle to ensure the vehicle remains within the determined limits/boundaries. The envelope control system 170 can also determine the boundaries and limits within which a vehicle is estimated to be free of collision.

In order to determine the boundaries/limits, the envelope control system 170 may monitor multiple factors including the path of travel of vehicle, such as vehicle 100. The path of travel of the vehicle 100 can be determined either by a human driver, sometimes referred to as a driver in the loop system, or by an autonomous driving system, such as the autonomous driving module 160.

In one example, the envelope control system 170 may use a model predictive control system to determine the path of travel. The envelope control system 170 may be designed to receive a path of travel information from either a driver or the autonomous driving module 160. The envelope control system 170 utilizes a common control scheme for both the autonomous mode (sometimes referred to as chauffeur mode) and the semi-autonomous mode (sometimes referred to as guardian mode) of the vehicle 100. This essentially allows the envelope control system 170 to use the same optimization problems and cost functions for both the autonomous mode and the semi-autonomous mode. As such, no matter which mode the vehicle 100 is in, the underlying algorithms remain the same.

Figure 2:
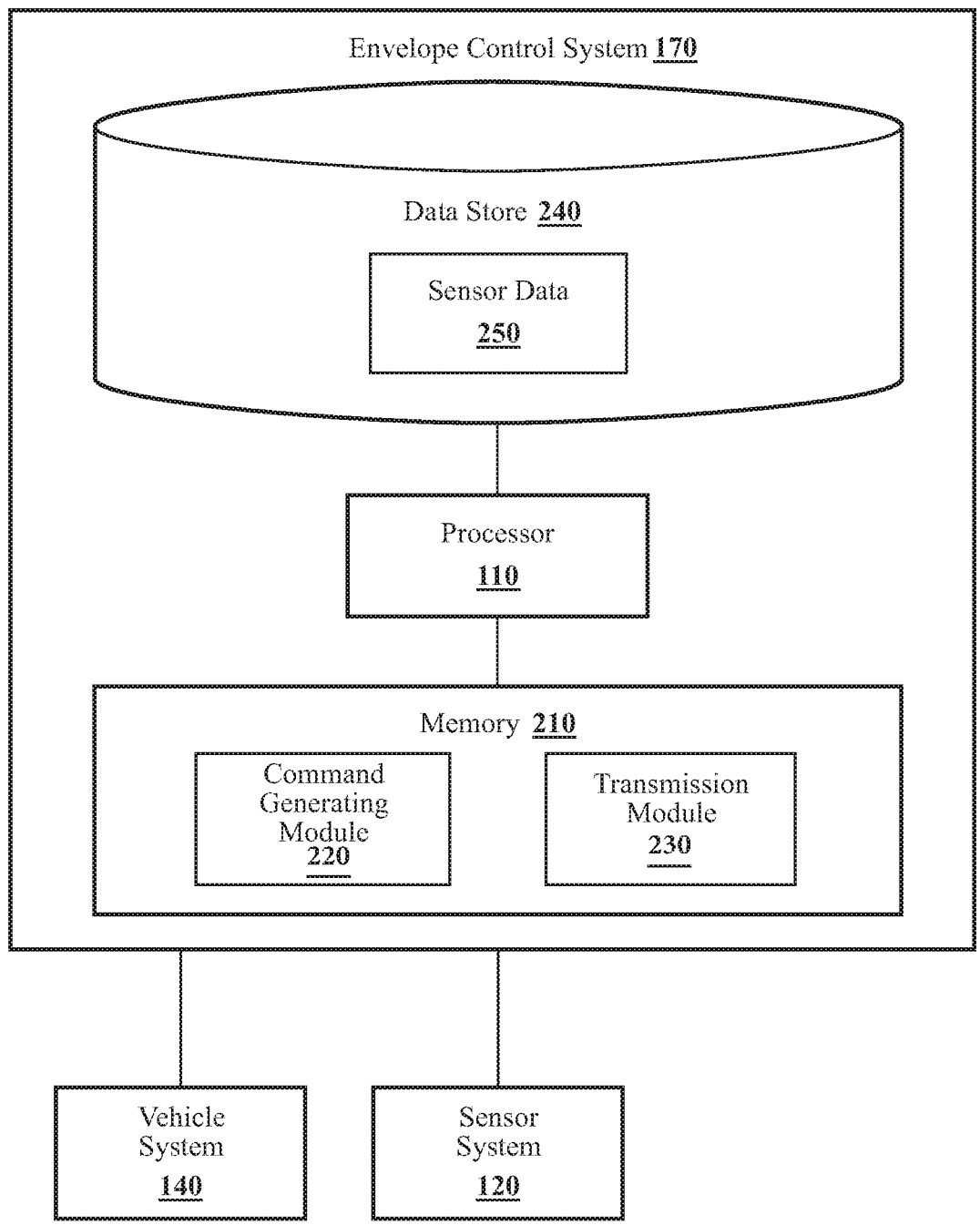
FIG. 2 illustrates one embodiment of an envelope control system that is associated with controlling a vehicle having an autonomous mode and a semi-autonomous mode.

With reference to FIG. 2, one embodiment of the envelope control system 170 is further illustrated. As shown, the envelope control system 170 includes a processor 110. Accordingly, the processor 110 may be a part of the envelope control system 170 or the envelope control system 170 may access the processor 110 through a data bus or another communication path. In one or more embodiments, the processor 110 is an application specific integrated circuit that is configured to implement functions associated with a command generating module 220 and a transmission module 230. In general, the processor 110 is an electronic processor such as a microprocessor that is capable of performing various functions as described herein. In one embodiment, the envelope control system 170 includes a memory 210 that stores the command generating module 220 and the transmission module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that when executed by the processor 110 cause the processor 110 to perform the various functions disclosed herein.

Furthermore, in one embodiment, the envelope control system 170 includes a data store 240. The data store 240 is, in one embodiment, an electronic data structure such as a database that is stored in the memory 210 or another memory and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes sensor data 250, along with, for example, other information that is used by the modules 220 and 230. The sensor data 250 may include some or all of the sensor data 119 shown in FIG. 1 and described later in this disclosure.

Accordingly, the command generating module 220 generally includes instructions that function to control the processor 110 to generate, in response to an input, at least one control signal for controlling the vehicle 100 by an envelope control system 170. As stated before, the envelope control system 170 utilizes a common control scheme for both the semi-autonomous mode and the autonomous mode. Moreover, the input is a driver input when the vehicle is in the semi-autonomous mode and the input is a pseudo-driver input when the vehicle is in the autonomous mode. This is advantageous because it does not require two or more control schemes, overlapping hardware, and shutting down and/or starting up another system with a different control scheme.

As to the driver input, the driver input includes at least one driver command. The driver command may be the commands placed by the driver on one or more vehicle systems, such as vehicle systems 140. The envelope control system 170 may also generate a driver predictive command based on the inputs provided by the driver. The purpose of generating a driver predictive command is to provide the common control scheme with both the current driver inputs but also predicted driver inputs so that the control scheme can anticipate potential future events. For example, the driver inputs can include a trajectory of the vehicle determined from the steering system 143. This may be determined by measuring the driver's current commanded handwheel (steering) angle and use steering system geometry to determine the initial driver command.

The envelope control system 170 may then determine the driver predictive command, based on the trajectory of the vehicle, over a time horizon so that future dynamic problems can be predicted and avoided. Essentially, by looking at the trajectory of the vehicle and combining this trajectory with other information, such as map data, one or more driver prediction commands can be generated that anticipates the future commands provided by the driver. This may be done by tracking the driver's command and determining an optimal sequence based on the driver's command. In one example, future diver handwheel commands may be based on a given the geometry of the road and other actors on the road, the vehicle dynamics, potentially even the driver's preferences. Further, the predicted commands may be limited based on the physical constraints of the vehicle actuators. At each real timestep, the first optimal command set of the time horizon is applied to the actuators 150, and then the process is repeated. When in an autonomous mode, the above is replaced with a pseudo driver algorithm.

In one example, in semi-autonomous and autonomous modes, the envelope control system 170 applies the following algorithm:

$$\min_{x} \sum_{k=1}^{N} x_s^T Q x_s + \sum_{k=1}^{N} u^T R u + \sum_{k=1}^{N} WS + \sum_{k=1}^{N} \gamma |F_{yf,driver,pred} - F_{yf}|$$

s.t. $x_s(k+1) = A_{disc} x_s(k) + B1_{disc} F_{yf}(k) + B3_{disc}$ $F_{yf}(k+1) = F_{yf}(k) + \Delta F_{yf}(k+1)$ $x_s(1) = x_{s,meas}$ $F_{yf}(1) = F_{yf,command} + \Delta F_{yf}(1)$ $u_{min}(k) \leq u(k) \leq u_{max}(k)$ $S(k) \geq 0$ $H_{vch}(k) x(k) \leq G_{veh}(k) + S_{veh}(k)$ -continued $H_{env}(k) x(k) \leq G_{env}(k)$ where $x_s(k) = [\beta(k) r(k) \Delta \psi(k) e(k)]^T$ $u(k) = [F_{yf}(k) \Delta F_{yf}(k)]^T$ $S(k) = S_{veh}(k)$ In semi-autonomous mode, $F_{yf,driver,pred}$=human driver input. In autonomous mode, $F_{yf,driver,pred}$=pseudo-driver input, which may be a desired feedforward angle (steering angle) to track the given path. The cost on tracking the driver is determined and weighed based on the other costs in the cost function. For example, the cost to stay in the road boundaries may be higher than the cost of tracking the driver's desired commands. The cost could change depending on the severity of the situation or the experience/comfort of the driver. In either instance, the main goal is to track the driver command when it is otherwise safe to do so. Additionally, it should be understood that either steering angle or lateral force commands could be tracked interchangeably, along with any other actuator state that might be directly correlated to the driver's inputs.

The input from the driver may be provided to a cost function to set a driver tracking cost. The driver tracking cost may considers the inputs from the driver and applies a cost function to them. More specifically, the first timestep in the horizon (k=1) may require minimization via the cost function of the difference in the driver's command lateral force $F_{yf,driver}$ (effected through the steering angle) and the optimal lateral force $F_{yf}$, whereas subsequent steps in the horizon track $F_{yf}$ to the predicted driver command $F_{yf,driver;pred}$. The result of this is the driver tracking cost, which is then provided to the common control scheme.

In the autonomous mode, the variables in the functions related to the driver's command may be removed and replaced with a pseudo-driver input. This allows for the seamless transitions between semi-autonomous and autonomous modes. The pseudo-driver input is created so that the formulation may be identical to the semi-autonomous driver command format. In this way, the computed feedforward commands for the autonomous mode are used in place of the driver's command lateral force $F_{yf,driver}$ (effected through the steering angle) for the algorithm shown above.

With regards to the pseudo-driver input, the pseudo-driver input may be a stabilizing prediction steering command. This stabilizing prediction steering command may be a stable lane keeping feedforward command. The stable lane keeping feedforward command may include a trajectory that substantially follows a lane center line, wherein the lane center line is a calculated line that is located between a right edge and a left edge of a lane the vehicle is traveling on.

The pseudo-driver input may be generated by any one of a number of different algorithms. For example, the algorithm utilized to generate the pseudo-driver input may utilize a lookahead feedback scheme and a feedforward algorithm based on a nonlinear vehicle-handling diagram. The feedforward algorithm may also incorporate a desired sideslip behavior. Once the pseudo-driver input has been generated, the pseudo-driver input is then provided to a constraint function. The pseudo-driver input may be applied to the same cost function as discussed above Constraints on actuator limits can be applied to both pseudo or regular driver commands as part of the envelope control algorithm.

Figure 3:
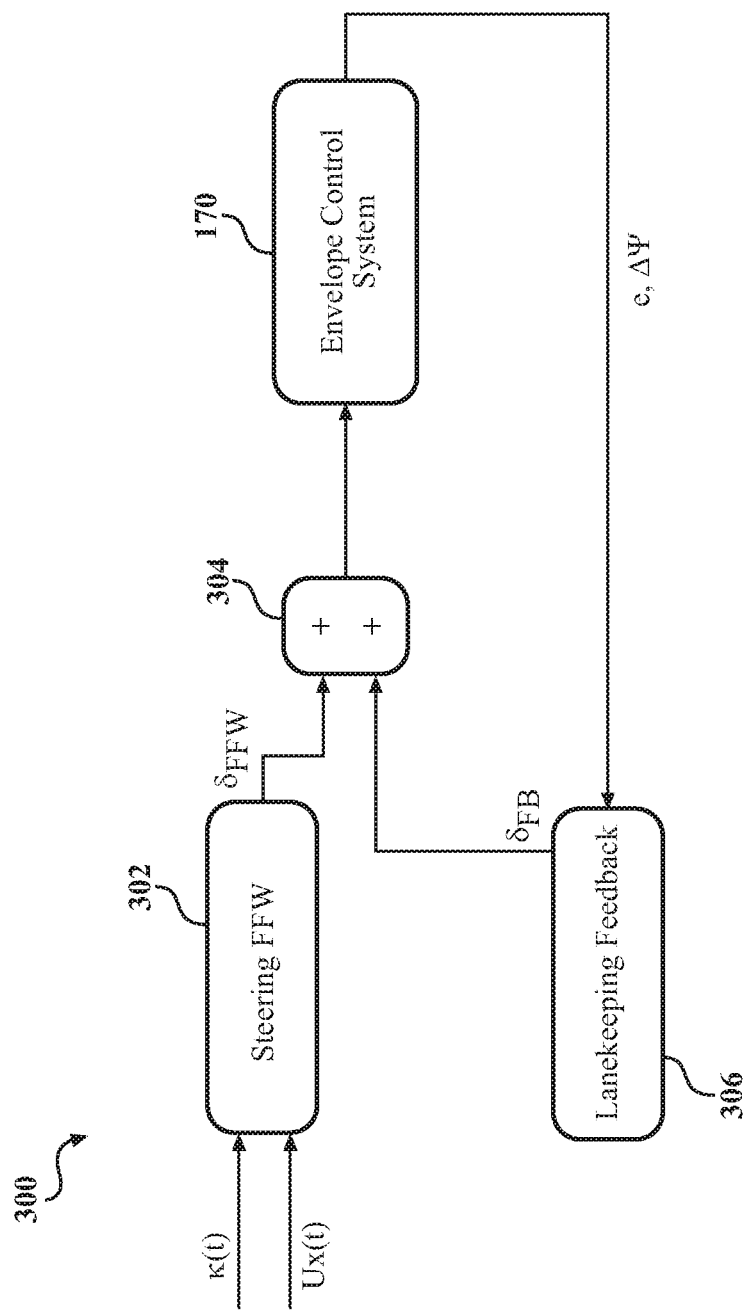
FIG. 3 illustrates a flow diagram of one example for generating a pseudo-driver input.

Referring to FIG. 3, a block diagram illustrating a flowchart for generating the pseudo-driver input is shown. As stated previously, any one of a number of different algorithms may be utilized to generate the pseudo-driver input. In this example, a steering feedforward module 302 receives as inputs a current path curvature κ and forward velocity Ux. The steering feedforward module 302 outputs a feedforward steering angle $\delta_{FFW}$ based on these inputs. A lane keeping feedback module 306 outputs a feedback steering angle SFB based on the lateral path deviation e of the vehicle 100 and path heading error $\Delta\Psi$. In this example, the pseudo-driver input δ is the sum of the feedback and feedforward inputs and is provided to the envelope control system 170.

Referring back to FIG. 2, the transmission module 230 generally includes instructions that function to control the processor 110 to transmit a control signal generated by the envelope control system 170 utilizing the common control scheme to a vehicle motion controller, such as the autonomous driving module 160. The autonomous driving module 160 uses these commands to control one or more the vehicle systems 140. The actuators 150 may actuate the vehicle systems 140.

As such, the common control scheme utilizes the same control scheme whether in an autonomous mode or a semi-autonomous mode. The outputs provided from the command generating module 220 are then provided to the transmission module 230, which then passes these signals onto the vehicle system 140. Many current systems utilize two or more control schemes that generate signals that are provided to a vehicle system. The common control scheme utilized in the autonomous mode or semi-autonomous mode is the same, with the exception that the input is changed. This is advantageous because it does not require two or more control schemes, overlapping hardware, and shutting down and/or starting up another system with a different control scheme.

Figure 4:
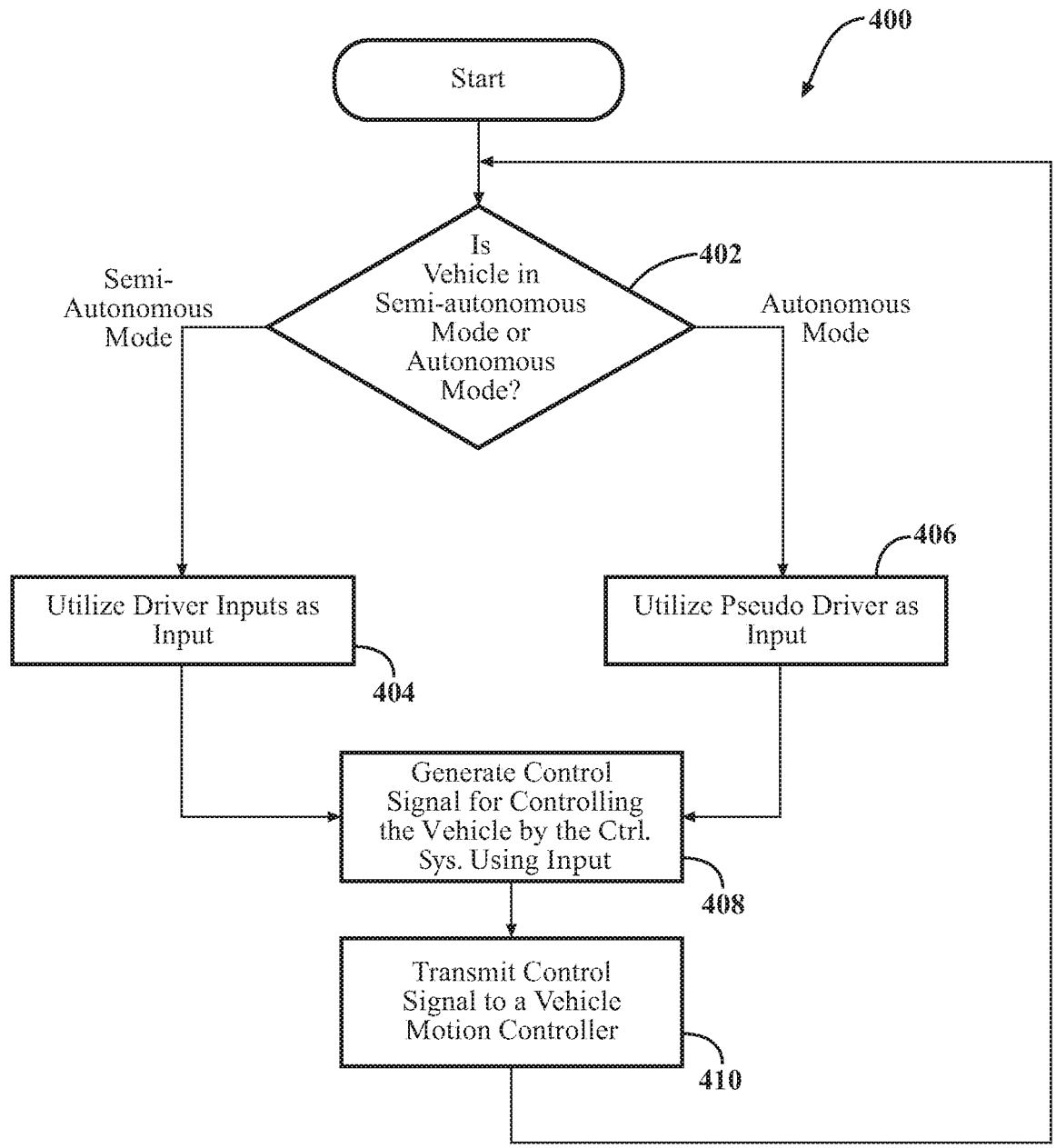
FIG. 4 illustrates a method for controlling a vehicle having an autonomous mode and a semi-autonomous mode.

Referring to FIG. 4, a method 400 for controlling a vehicle having an autonomous mode and a semi-autonomous mode is shown. The method 400 will be described from the viewpoint of the vehicle 100 of FIG. 1 and the envelope control system 170 of FIG. 2. However, it should be understood that this is just one example of implementing the method 400. While method 400 is discussed in combination with the envelope control system 170, it should be appreciated that the method 400 is not limited to being implemented within the envelope control system 170, but is instead one example of a system that may implement the method 400.

At step 402, a decision is made by the command generating module 220 if the vehicle 100 and is in a semi-autonomous mode or an autonomous mode. In deciding which mode the vehicle 100 is in, the command generating module 220 may look at one of a number of different inputs. For example, the input system 130 of the vehicle 100 may allow for the driver of the vehicle 100 to indicate whether they would like to vehicle 100 to be in autonomous mode or semi-autonomous mode. Additionally or alternatively, the autonomous driving module 160 may be able to monitor the sensor system 120 to determine if the vehicle should be in an autonomous mode or a semi-autonomous mode.

If it is determined by the command generating module 220 that the vehicle is in a semi-autonomous mode, the method proceeds to step 404. In step 404, the driver inputs are utilized as an input to the common control scheme of the envelope control system 170. The driver input may include one or more driver commands and the predicted driver command. The driver commands may be commands from the driver that are placed on the propulsion system 141, the braking system 142, the steering system 143, the throttle system 144, the transmission system 145, or any of the systems making up the vehicle systems 140. The predicted driver command is a prediction based on the trajectory of the vehicle and other information from the sensor system 120, sensor data 119, and/or map data 116.

In this situation, when the input is the driver input, the input from the driver may be provided to a cost function to set the driver tracking cost. The driver tracking cost considers the input from the driver and apply a cost function to the driver input value itself, or to the difference in the driver input to an optimized state. The result of this is the driver tracking cost, which is then provided to the common control scheme.

If it is determined by the command generating module 220 that the vehicle is in an autonomous mode, the method proceeds instead to step 406. In step 406, the common control scheme of the envelope control system 170 utilizes a pseudo-driver input as an input. As previously described, the pseudo-driver input may be a stabilizing prediction steering command. This stabilizing prediction steering command may be a stable lane keeping feedforward command that essentially keeps the vehicle centered in the lane. The pseudo-driver tracking cost may consider the input from the pseudo-driver and applies a cost function to the pseudo-driver input value itself, or to the difference in the pseudo-driver input to an optimized state.

In step 408, the command generating module 220 generates a control signal for controlling the vehicle. The control signal is generated by the envelope control system 170 using the common control scheme described in the paragraphs above. The control scheme utilized stays the same even if the vehicle changes modes between the autonomous mode and the semi-autonomous mode. One of the changes that occurs between changing modes, as stated previously, involves the input provided to the common control scheme. As stated previously, in an autonomous mode, a pseudo-driver input is used as an input to the common control scheme, while in a semi-autonomous mode; the driver input is used as the input to the common control scheme.

Once a control signal has been generated, the transmission module 230 transmits the control signal to a vehicle motion controller. The vehicle motion controller may be the autonomous driving module 160 that may control one or more of the vehicle systems 140. The control of the vehicle systems 140 may be via one or more actuators 150.

FIG. 1 will now be discussed in full detail as an example environment within which the system and methods disclosed herein may operate. In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the envelope control system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the envelope control system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the envelope control system 170, and/or the autonomous driving module(s) 160 may control some or all of these vehicle systems 140 and, thus, may be partially or fully autonomous.

The processor(s) 110, the envelope control system 170, and/or the autonomous driving module(s) 160 can be operatively connected to communicate with the various vehicle systems 140 and/or individual components thereof. For example, returning to FIG. 1, the processor(s) 110, the envelope control system 170, and/or the autonomous driving module(s) 160 can be in communication to send and/or receive information from the various vehicle systems 140 to control the movement, speed, maneuvering, heading, direction, etc. of the vehicle 100. The processor(s) 110, the envelope control system 170, and/or the autonomous driving module(s) 160 may control some or all of these vehicle systems 140.

The processor(s) 110, the envelope control system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the envelope control system 170, and/or the autonomous driving module(s) 160 can control the direction and/or speed of the vehicle 100. The processor(s) 110, the envelope control system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the envelope control system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the transmission module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for controlling a vehicle having an autonomous mode and a semi-autonomous mode, the method comprising the steps of:
   generating, in response to an input, at least one control signal for controlling the vehicle by a control system, wherein the control system utilizes a common control scheme for controlling the movement of the vehicle in both the semi-autonomous mode and the autonomous mode, wherein the input to the common control scheme is a driver input from a driver when the vehicle is in the semi-autonomous mode and the input to the common control scheme is a pseudo-driver input when the vehicle is in the autonomous mode;
   wherein algorithms utilized by the common control scheme to generate the at least one control signal remain the same for both the semi-autonomous mode and the autonomous mode;
   transmitting the at least one control signal to a vehicle motion controller, wherein the vehicle motion controller controls the movement of the vehicle; and
   wherein the semi-autonomous mode requires the driver to provide input to the control system to perform a maneuvering of the vehicle and the autonomous mode requires no input from the driver to the control system to perform the maneuvering of the vehicle.

2. The method of claim 1, wherein the pseudo-driver input and the driver input utilize a common format.

3. The method of claim 1, wherein the driver input includes at least one of a driver command and a predicted driver command.

4. The method of claim 3, wherein the driver command and the predicted driver command include a trajectory of the vehicle.

5. The method of claim 1, wherein the pseudo-driver input is a stabilizing prediction steering command.

6. The method of claim 5, wherein the stabilizing prediction steering command is a stable lane keeping feedforward command.

7. The method of claim 6, wherein the stable lane keeping feedforward command includes a trajectory that substantially follows an optimal trajectory or a lane center line, wherein the lane center line is a calculated line that is located between a right edge and a left edge of a lane the vehicle is travelling on.

8. The method of claim 1, wherein:
   when the input is the driver input, the input is provided to a cost function to set a driver tracking cost; and
   when the input is the pseudo-driver input, the input is provided to the cost function to set a pseudo-driver tracking cost.

9. A system for controlling a vehicle having an autonomous mode and a semi-autonomous mode, the system comprising:
   one or more processors;
   a memory in communication with the one or more processors, the memory storing:
   a command generating module that when executed by the one or more processors cause the one or more processors to generate, in response to an input, at least one control signal for controlling the vehicle by a control system, wherein the control system utilizes a common control scheme for controlling the movement of the vehicle in both the semi-autonomous mode and the autonomous mode, wherein the input to the common control scheme is a driver input from a driver when the vehicle is in the semi-autonomous mode and the input to the common control scheme is a pseudo-driver input when the vehicle is in the autonomous mode;
   wherein algorithms utilized by the common control scheme to generate the at least one control signal remain the same for both the semi-autonomous mode and the autonomous mode;
   a transmission module that when executed by the one or more processors cause the one or more processors to transmit the at least one control signal to a vehicle motion controller, wherein the vehicle motion controller controls the movement of the vehicle; and
   wherein the semi-autonomous mode requires the driver to provide input to the control system to perform a maneuvering of the vehicle and the autonomous mode requires no input from the driver to the control system to perform the maneuvering of the vehicle.

10. The system of claim 9, wherein the pseudo-driver input and the driver input utilize a common format.

11. The system of claim 9, wherein the driver input includes at least one of a driver command and a predicted driver command.

12. The system of claim 11, wherein the driver command and the predicted driver command include a trajectory of the vehicle.

13. The system of claim 9, wherein the pseudo-driver input is a stabilizing prediction steering command.

14. The system of claim 13, wherein the stabilizing prediction steering command is a stable lane keeping feedforward command.

15. The system of claim 14, wherein the stable lane keeping feedforward command includes a trajectory that substantially follows a lane center line, wherein the lane center line is a calculated line that is located between a right edge and a left edge of a lane the vehicle is travelling on.

16. The system of claim 9, wherein the command generating module further includes instructions that when executed by the one or more processors cause the one or more processors to:
  when the input is the driver input, provide the input to a cost function to set a driver tracking cost; and
  when the input is the pseudo-driver input, provide the input to a constraint function to set a constraint.

17. A non-transitory computer-readable medium for controlling a vehicle having an autonomous mode and a semi-autonomous mode and including instructions that when executed by one or more processors cause the one or more processors to:
  generate, in response to an input, at least one control signal for controlling the vehicle by a control system, wherein the control system utilizes a common control scheme for controlling the movement of the vehicle in both the semi-autonomous mode and the autonomous mode, wherein the input to the common control scheme is a driver input from a driver when the vehicle is in the semi-autonomous mode and the input to the common control scheme is a pseudo-driver input when the vehicle is in the autonomous mode;
  wherein algorithms utilized by the common control scheme to generate the at least one control signal remain the same for both the semi-autonomous mode and the autonomous mode;
  transmit the at least one control signal to a vehicle motion controller, wherein the vehicle motion controller controls the movement of the vehicle; and
  wherein the semi-autonomous mode requires the driver to provide input to the control system to perform a maneuvering of the vehicle and the autonomous mode requires no input from the driver to the control system to perform the maneuvering of the vehicle.

18. The non-transitory computer-readable medium of claim 17, wherein the pseudo-driver input and the driver input utilize a common format.

19. The non-transitory computer-readable medium of claim 17, wherein the driver input includes at least one of a driver command and a predicted driver command.

20. The non-transitory computer-readable medium of claim 19, wherein the driver command and the predicted driver command include a trajectory of the vehicle.

* * * * *